United States Patent
Tonooka

[11] Patent Number: 6,129,382
[45] Date of Patent: Oct. 10, 2000

[54] AIR BAG

[75] Inventor: Masami Tonooka, Shizuoka, Japan

[73] Assignee: Nihon Plast Co., Ltd., Fuji, Japan

[21] Appl. No.: 09/342,739

[22] Filed: Jun. 29, 1999

[30] Foreign Application Priority Data

Jun. 30, 1998 [JP] Japan .................................. 10-185437

[51] Int. Cl.<sup>7</sup> ................................................ B60R 21/16
[52] U.S. Cl. ........................................................ 280/743.1
[58] Field of Search .......................................... 280/743.1

[56] References Cited

U.S. PATENT DOCUMENTS

| | | | |
|---|---|---|---|
| 5,094,476 | 3/1992 | Chihaya | 280/743.1 |
| 5,310,216 | 5/1994 | Wehner et al. | 280/743.1 |
| 5,432,273 | 7/1995 | Hawthorn et al. | 280/743.1 |
| 5,549,326 | 8/1996 | Ramos | 280/743.1 |
| 5,584,508 | 12/1996 | Maruyama et al. | 280/743.1 |
| 5,664,805 | 9/1997 | Yoshida et al. | 280/743.1 |
| 5,855,393 | 1/1999 | Keshavaraj | 280/743.1 |

FOREIGN PATENT DOCUMENTS 7-125592 5/1995 Japan .

*Primary Examiner*—Kenneth R. Rice
*Attorney, Agent, or Firm*—Foley & Lardner

[57] ABSTRACT

The invention relates to an automotive air bag for an air bag device. This air bag in an inflated condition is generally pentahedral by the provision of a first or bottom surface, a second or upper surface, a front surface for cushioning a front passenger, and a pair of side surfaces. The first and second surfaces each extend from a first or forehand edge portion of the air bag. The first surface has (1) an opening for introducing gas into the air bag and (2) a reinforced portion surrounding the opening and adapted to be fastened to a retainer. This opening is disposed in the vicinity of the first edge portion. Thus, the air bag can efficiently be inflated.

10 Claims, 6 Drawing Sheets

AIR BAG

BACKGROUND OF THE INVENTION

The present invention relates to air bags which become bag-like in shape by introducing gas thereinto, for cushioning, for example, automobile passengers from hitting against, for example, automotive front windshield.

There are certain types of automotive air bag that are designed for cushioning a front or rear passenger. Such type of air bag is disclosed in U.S. Pat. No. 5,664,805 corresponding to Japanese Patent First Publication JP-A-7-125592. The air bag disclosed therein is prepared by sewing together first and second panels, each being substantially rectangular in shape, along peripheral edges of these panels. There is a recent demand for an air bag that can efficiently be inflated.

SUMMARY OF THE INVENTION

It is therefore an object of the present invention to provide an air bag that can efficiently be inflated.

According to the present invention, there is provided an air bag for an air bag device, which is in an inflated condition by introducing gas thereinto. The air bag comprises (1) a first edge portion; (2) a first surface extending from the first edge portion and terminated with a second edge portion; (3) a second surface extending from the first edge portion and terminated with a third edge portion; (4) a front surface connecting together the second and third edge portions; and (5) a pair of side surfaces connecting together opposite sides of the first and second surfaces. The first surface comprises (1) an opening for introducing gas into the air bag, which opening is disposed in the vicinity of the first edge portion, and (2) a reinforced portion surrounding the opening and adapted to be fastened to another member.

DESCRIPTION OF THE PREFERRED EMBODIMENTS

Referring to FIGS. 1–6, an air bag 10 according to a preferred embodiment of the present invention is described in detail in the following.

Figure 1:
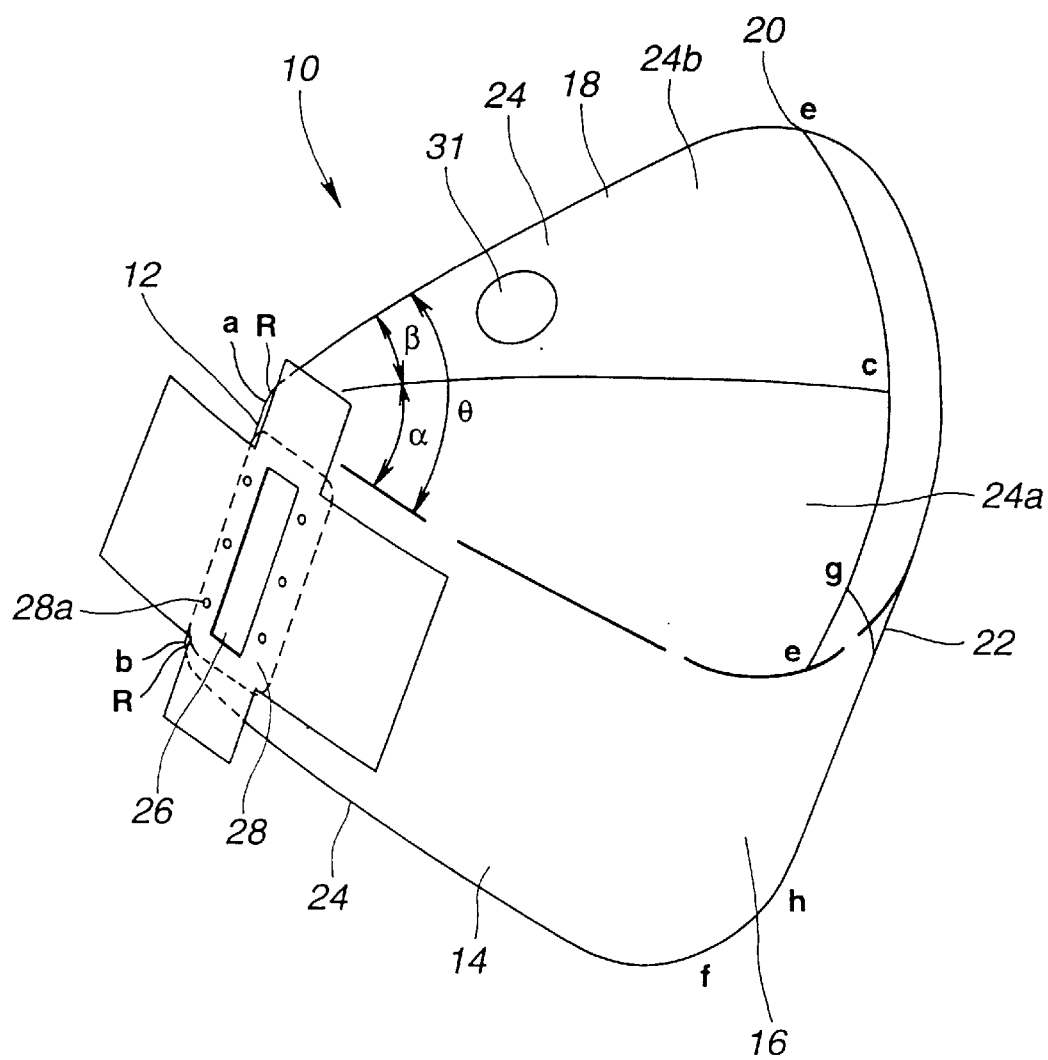
FIG. 1 is a perspective view showing an air bag according to a preferred embodiment of the present invention, which is in an inflated condition.
Figure 2:
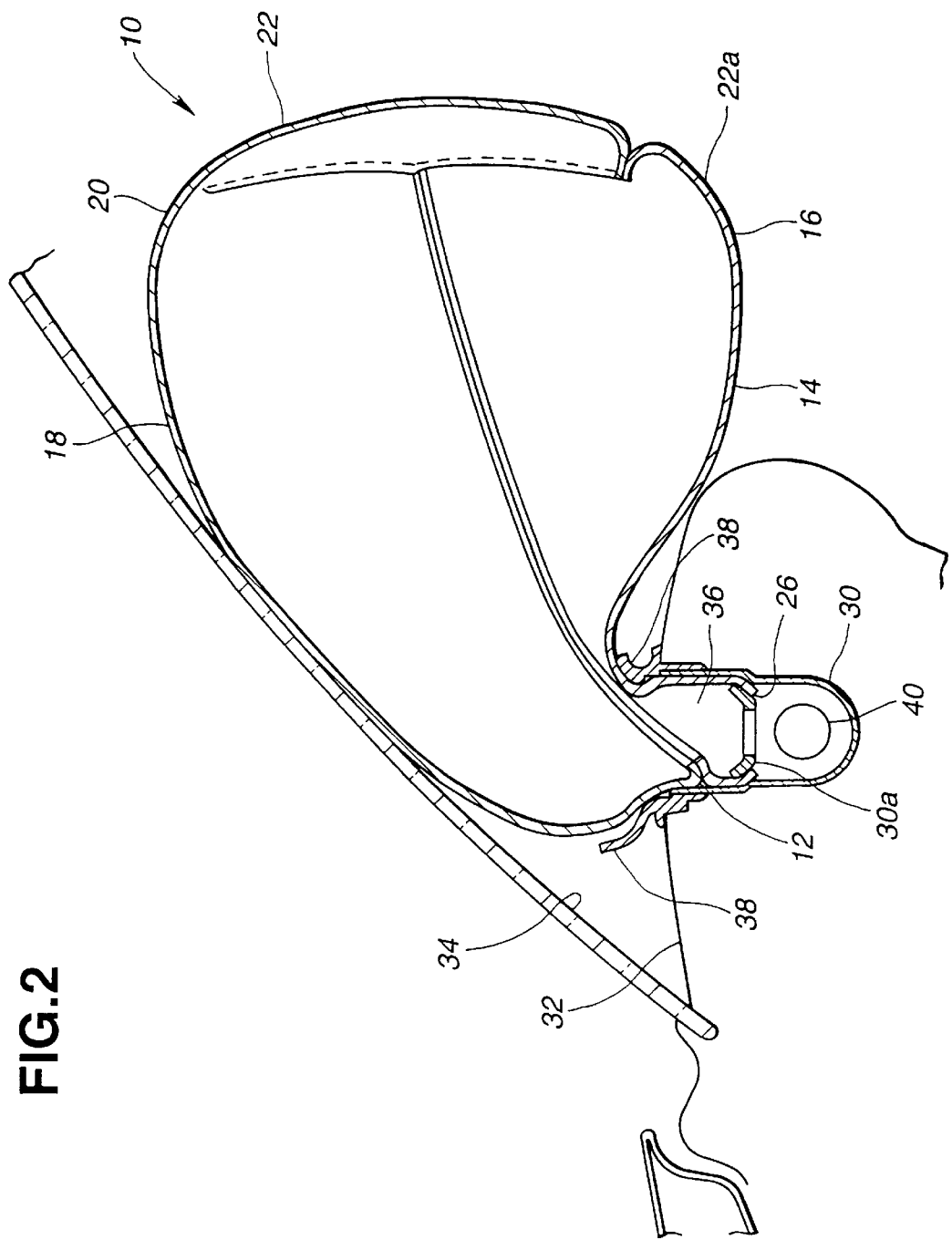
FIG. 2 is a partly sectional side view showing the air bag projected from an automotive instrument panel.

As is seen from FIGS. 1–2, the air bag 10 of an air bag device, which is in an inflated condition, has (1) a first edge portion 12; (2) a first or bottom surface 14 extending from the first edge portion 12 and terminated with a second edge portion 16; (3) a second or upper surface 18 extending from the first edge portion 12 and terminated with a third edge portion 20; (4) a front surface 22 connecting together the second and third edge portions 16 and 20; and (5) a pair of side surfaces 24 connecting together opposite sides of the first and second surfaces 14 and 18. The first surface 14 comprises an opening 26 for introducing gas into the air bag 10. This opening 26 is disposed in the vicinity of the first edge portion 12. With this, it becomes possible to efficiently supply gas toward the front surface 22 to inflate the air bag 10. The first surface 14 further comprises a reinforced portion 28 surrounding the opening 26 and adapted to be fastened to another member that may be a retainer 30 of the air bag device for retaining the air bag 10 in a position (see FIG. 2). As shown in FIG. 1, the air bag 10 has a pair of ventilation openings 31 formed on the side surfaces 24 thereof. Therefore, the ventilation openings 31 can be prevented from being blocked by an automotive instrument panel 32 and the like (see FIG. 2). Furthermore, it is possible to prevent the exhaust gas of the air bag 10 from being directed toward a front passenger.

As is shown in FIGS. 1 and 2, the air bag 10 is generally pentahedral in shape by the provision of the first and second surfaces 14 and 18, the front surface 22, and the pair of side surfaces 24. As shown in FIG. 2, the air bag 10 may be installed in the instrument panel 32 for cushioning a front passenger from hitting against an automotive front windshield 34. In this case, the first edge portion 12 is disposed substantially at the forehand position of the air bag 10 in a fore-and-aft direction of an automobile (see FIG. 2). Furthermore, when the air bag 10 projects from the instrument panel 32, the front surface 22 of the air bag 10 moves toward a front passenger in order to provide the upper part of body of the front passenger with the cushioning effect.

Figure 5:
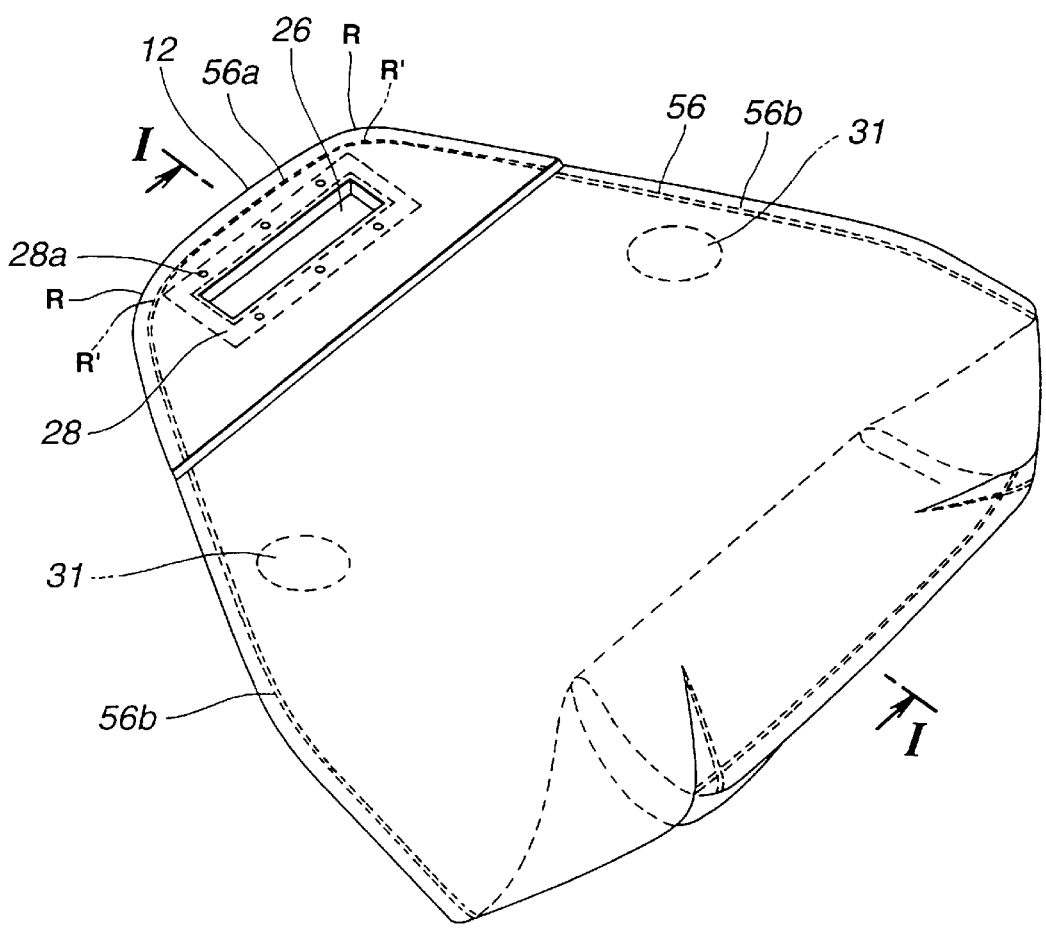
FIG. 5 is a perspective view showing a semi-finished product of the air bag.

As is seen from FIG. 2, the above-mentioned retainer 30, which is box-like in shape, has an opening 36 that is covered by a lid member 38 under normal conditions prior to a collision. An inflator 40 is received in the retainer 30 and positioned below a mid retainer 30a of the retainer 30. The inflator 40 is generally cylindrical in shape and serves to inflate the air bag 10 by ejecting gas therefrom. Under the normal conditions, the air bag 10 is folded above the mid retainer 30a in a manner to be received in the retainer 30. As shown in FIGS. 1 and 5, the reinforced portion 28 of the first surface 14 borders on the first edge portion 12 and has holes 28a for receiving therethrough fasteners (not shown) such as bolts. In fact, as shown in FIG. 2, the reinforced portion 28 is received in the inside space of the retainer 30 and is fixed between the mid retainer 30a and the retainer 30, using the fasteners.

Operation of the air bag device is briefly described, as follows. When a collision sensor detects a collision, gas (e.g., nitrogen gas) is ejected from the inflator 40 to inflate the air bag 10. Thus, the air bag projects by tearing the lid member 38 open along a tear line thereof (see FIG. 2). Under a fully inflated condition, the air bag 10 occupies a space between the front windshield 34 and the instrument panel 32, in order to cushion a front passenger.

As mentioned above, the air bag 10 has a generally pentahedral shape shown in FIGS. 1 and 2 such that the air bag is tapered toward the first edge portion 12. Therefore, upon a collision, the air bag expands smoothly in the space therebetween. With this, the air bag is inflated as originally designed. Thus, the front surface 22 of the air bag does not become distorted, but has a proper shape.

As is seen from FIG. 1, the air bag is designed such that a maximum angle θ between the first and second surfaces 14 and 18 is preferably from 40 to 120 degrees. This maximum angle θ is provided when the air bag 10 is fully inflated. Furthermore, it is preferable that the maximum angle θ is greater than an angle defined between a first plane (i.e., the front windshield 34) and a second plane (i.e., the instrument panel 32), by an angle of from 5 to 30 degrees. With this, the air bag in an inflated condition is not movable therebetween and takes a proper position for providing the cushioning effect (see FIG. 2). The maximum angle θ is adjusted suitably within the above range, depending on the angle between the front windshield and the instrument panel. For example, when the angle therebetween is about 90 degrees, the maximum angle θ may be adjusted to an angle greater than 90 degrees, such as 115 degrees. Furthermore, when it is 35 degrees, the maximum angle θ may be adjusted to 40 degrees.

Figure 6:
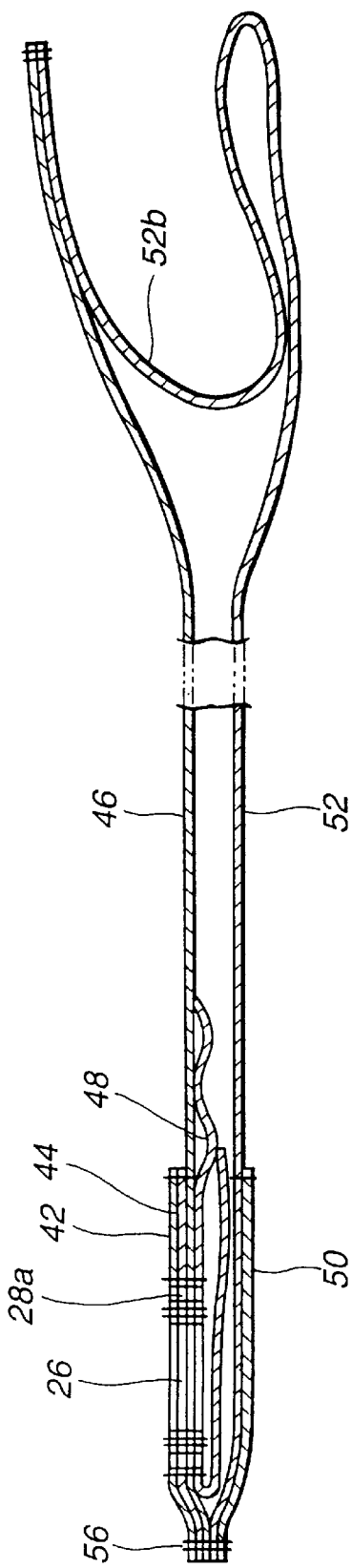
FIG. 6 is a cross sectional view taken along lines I—I of FIG. 5.

An exemplary method for producing the air bag is described in the following. At first, as is seen from FIG. 3, first and second minor panels 42 and 44, each being generally trapezoidal in shape, are put on the inside surface 46*a* of a first major panel 46, and a third minor panel 48, which has a generally cross shape, is put on the outside surface (not shown in FIG. 3) of the first major panel 46, in a manner that openings 26 and through holes 28*a* of these panels 42, 44, 46 and 48 are mated with each other. Then, these four panels are sewn together by making a sewing line along the periphery of the opening 26, thereby to reinforce the first major panel 46. Separately, a fourth minor panel 50, which is generally trapezoidal in shape, is put on the inside surface (not shown in FIG. 3) of a second major panel 52 in a manner that the points "a" and "b" of the fourth minor panels 50 and those of the second major panels 52 are mated with each other, and a pair of fifth ringlike minor panels 54 are also put on the inside surface thereof in a manner that each ringlike minor panel 54 is mated with the ventilation opening 31 of the second major panel 52. Each circular opening 31 may have a diameter of about 70 mm. Then, the fourth and fifth minor panels 50 and 54 are sewn to the second major panel 52, thereby to reinforce the second major panel 52 with them. Then, the outside surface (not shown) of the above-reinforced first major panel 46 spread flat is put on the outside surface 52*a* of the second major panels 52 spread flat, in a manner that the points a, b, c, d, e and f of the first major panel are mated with those of the second major panel 52. Then, a bulged tail portion 52*b* of the second major portion 52 is folded (see FIG. 6), and the points g and h of the second major panel 52 are mated with those of the first major panel 46. Then, the reinforced first and second major panels are sewn together by making a sewing line 56 along peripheries of the first and second major panels (see FIGS. 4*a*, 4*b* and 5). The obtained semi-product of the air bag 10 shown in FIGS. 5 and 6 is turned inside out in a manner to expose the outside surfaces of the first and second major panels, thereby to obtain the air bag. With this, the sewing line 56 is concealed. After that, the air bag is fastened to the retainer 30, as described hereinabove. The above-mentioned method is superior in workability in the sewing operation. With this, the production cost can be reduced.

Material of the first and second major panels 46 and 52 and the second minor panel 44 may be a first fabric (density: about 150 g/m²) made of threads of about 200 denier. Material of the other minor panels may be a second fabric having a thickness that is generally equal to or thicker than that of the first fabric. It is preferable to apply a silicone coating to one surface of each of the other minor panels.

Figure 3:
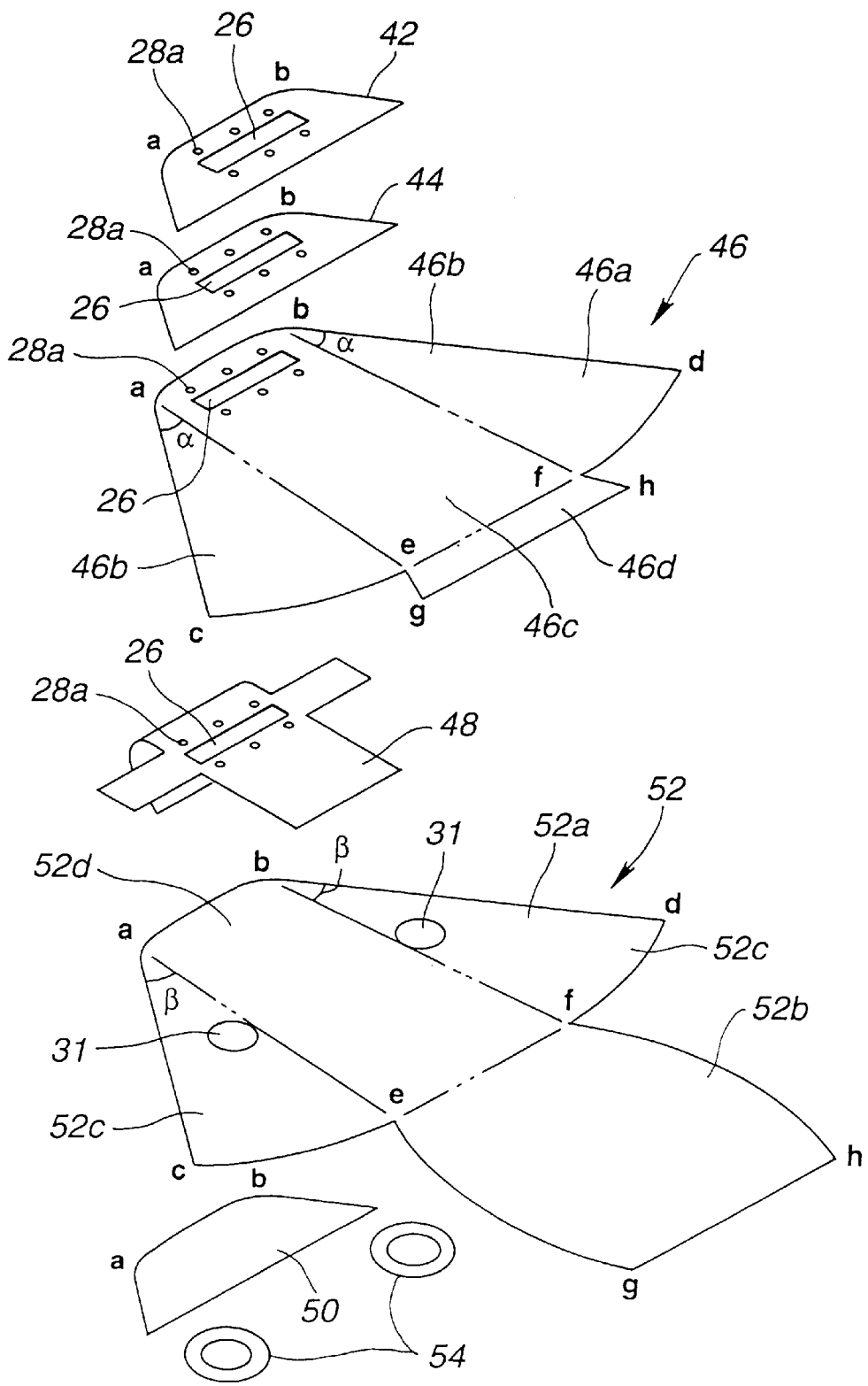
FIG. 3 is an exploded perspective view showing first and second major panels and minor panels for producing the air bag.
Figure 4A:
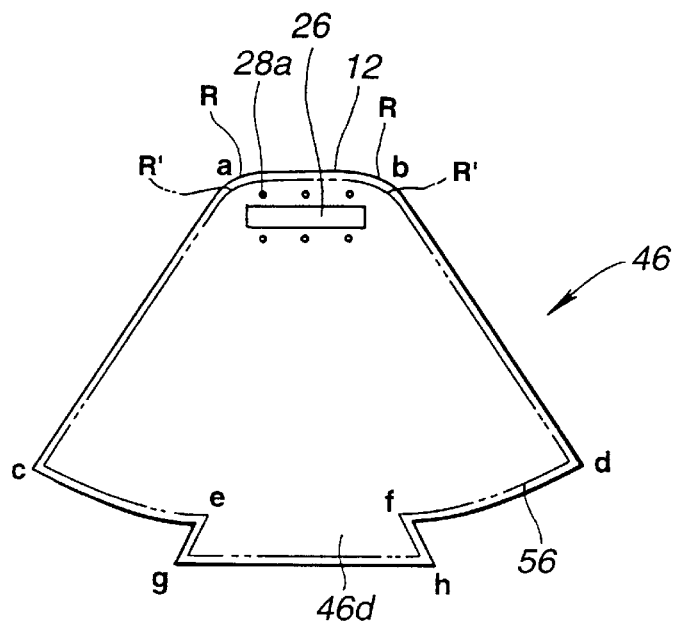
FIGS. 4a and 4b are plan views respectively showing the first and second major panels of FIG. 3.
Figure 4B:
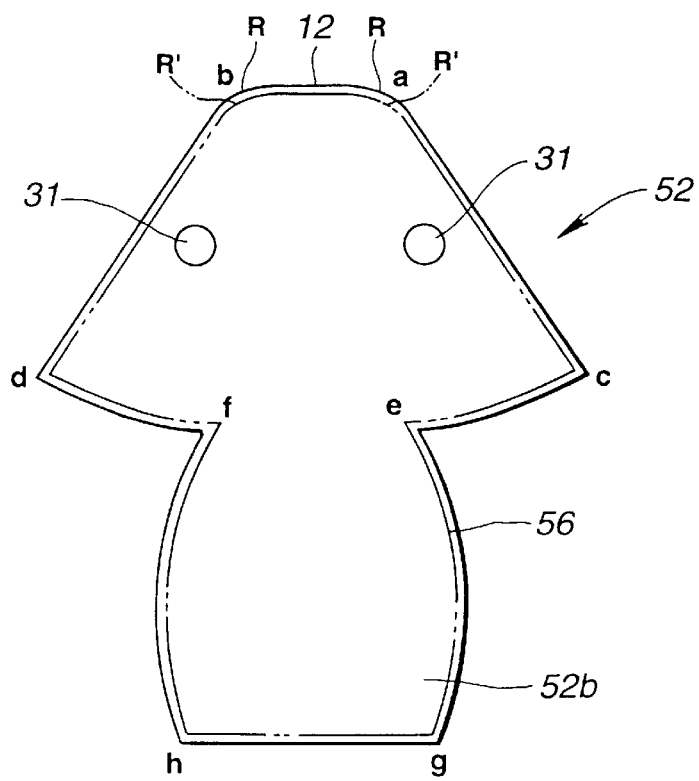

As is seen from FIGS. 1 and 3, side sectorial portions 46*b* of the first major panel 46 constitute lower portions 24*a* of the side surfaces 24 of the air bag; a center portion 46*c* thereof constitutes the first surface 14; and a tail portion 46*d* thereof constitutes a minor portion 22*a* of the front surface 22 (see FIG. 2). Side sectorial portions 52*c* of the second major panel 52 constitute upper portions 24*b* of the side surfaces 24 of the air bag; a center portion 52*d* thereof constitutes the second surface 18; and the tail portion 52*b* thereof constitutes a major portion of the front surface. The segment between the points a and b constitutes the first edge portion 12 of the air bag. As is seen from FIGS. 4*a*, 4*b* and 5, it is preferable that corners R of the first and second major panels are gently curved and that the sewing line 56 is also gently curved at corners R' corresponding to the corners R. With this, force or tension does not tend to concentrate at one point of the sewing line 56, thereby to improve the air bag in strength. The sewing line 56 has a first linear portion 56*a*, first and second side linear portions 56*b*, and the corners R' (see FIG. 5). Herein, the adjective "linear" of these portions is referred to as being in the form of line, not as being straight. It is more preferable that each curve R' of the sewing line 56 has a radius of curvature of not less than 20 mm, for example, 100 mm.

As is seen from FIGS. 1 and 3, the angles α and β may respectively be 30 degrees. Alternatively, the angles α and β may respectively be 40 degrees and 20 degrees. In these cases, the maximum angle θ (α+β) of the air bag becomes 60 degrees. Such air bag (θ: 60 degrees) projects into a space between the instrument panel and the front windshield, which may be inclined by an angle of about 40 degrees relative to the upper surface of the instrument panel (see FIG. 2). With this, the first surface 14 may be deformed as shown in FIG. 2. The upward expansion of the air bag is limited by the front windshield. Thus, the angle between the first and second surfaces 14 and 18 may become about 40 degrees. Furthermore, the air bag may be displaced downward by a distance or stroke of about 50 mm, relative to the position of the air bag inflated in condition that the front windshield has been omitted. In this condition, the angle between the first and second surfaces may become about 50 degrees.

It is optional to install the above-described air bag in an automotive steering wheel for cushioning the driver, in a seat back of automotive front seat for cushioning a rear passenger, or in an automotive door or the like for cushioning a passenger from a side impact. Furthermore, it is optional to apply the air bag to uses other than vehicles such as automobile.

What is claimed is:

1. An air bag for an air bag device, said air bag being in an inflated condition by introducing gas thereinto, said air bag comprising:

a first edge portion;

a first surface extending from said first edge portion and terminated with a second edge portion;

a second surface extending from said first edge portion and terminated with a third edge portion;

a front surface connecting together said second and third edge portions; and a pair of side surfaces connecting together opposite sides of said first and second surfaces, wherein said first surface comprises (1) an opening for introducing the gas into said air bag, which opening is disposed in the vicinity of said first edge portion, and (2) a reinforced portion surrounding said opening and adapted to be fastened to another member.

2. An air bag according to claim 1, wherein a maximum angle between said first and second surfaces is from 40 to 120 degrees, said maximum angle being provided when said air bag is fully inflated.

3. An air bag according to claim 1, wherein a maximum angle between said first and second surfaces, which is provided when said air bag is fully inflated, is greater than an angle defined between first and second planes, by an angle of from 5 to 30 degrees, each of said first and second planes being defined by a space receiving therein said air bag in the inflated condition.

4. An air bag according to claim 3, wherein said first an second planes are respectively defined by a vehicular front windshield and a vehicular instrument panel.

5. An air bag according to claim 1, wherein said air bag further comprises (1) a first major panel providing said first surface and a part of said pair of side surfaces and (2) a second major panel providing said second surface and the rest of said pair of side surfaces, and said air bag is prepared by a method comprising the steps of (a) spreading flat said first and second major panels; (b) putting together said first and second major panels; and (c) sewing together said first and second major panels.

6. An air bag according to claim 5, wherein a sewing line formed by the step (c) comprises (1) a first linear portion along said first edge portion, (2) a pair of second and third side linear portions each continuous with said first linear portion, for providing said pair of side surfaces, (3) a first corner defined between said first linear portion and said second side linear portion, and (4) a second corner defined between said first linear portion and said third side linear portion, and wherein each of said first and second corners is gently curved.

7. An air bag according to claim 6, wherein each of said first and second corners has a radius of curvature of not less than 20 mm.

8. An air bag according to claim 1, wherein said reinforced portion comprises a reinforcing minor panel sewed to said first major panel.

9. An air bag according to claim 1, wherein said reinforced portion comprises a plurality of through holes for receiving fasteners used for fastening said air bag to said another member.

10. An air bag for an air bag device, comprising:

a first section for defining a first edge portion of said air bag in an inflated condition of said air bag;

a second section for defining a first surface of said air bag in said inflated condition, said first surface extending from said first edge portion to a second edge portion, said first surface comprising (1) an opening for introducing gas into said air bag and (2) a reinforced portion surrounding said opening and adapted to be fastened to another member, said opening being disposed in the vicinity of said first edge portion;

a third section for defining a second surface of said air bag in said inflated condition, said second surface extending from said first edge portion to a third edge portion;

a fourth section for defining a front surface of said air bag in said inflated condition, said front surface connecting together said second and third edge portions; and a fifth section for defining a pair of side surfaces of said air bag in said inflated condition, said pair of side surfaces connecting together said first and second surfaces.

\* \* \* \* \*